(12) United States Patent
Jensen

(10) Patent No.: US 9,475,127 B2
(45) Date of Patent: Oct. 25, 2016

(54) DEVICE FOR INTERNAL CHIPS CUTTING MACHINING WITH A NOZZLE FOR FLUSHING CUTTER FLUID ON THE CUTTER

(75) Inventor: Tormod Jensen, Ranheim (NO)

(73) Assignee: TEENES ASA, Tondheim (NO)

( * ) Notice: Subject to any disclaimer, the term of this patent is extended or adjusted under 35 U.S.C. 154(b) by 473 days.

(21) Appl. No.: 14/004,378

(22) PCT Filed: Mar. 9, 2012

(86) PCT No.: PCT/EP2012/054112
§ 371 (c)(1),
(2), (4) Date: Oct. 3, 2013

(87) PCT Pub. No.: WO2012/123359
PCT Pub. Date: Sep. 20, 2012

(65) Prior Publication Data
US 2014/0030037 A1    Jan. 30, 2014

(30) Foreign Application Priority Data
Mar. 11, 2011    (NO) .................................. 20110377

(51) Int. Cl.
*B23B 29/034*    (2006.01)
*B23B 47/34*    (2006.01)
*B23B 27/10*    (2006.01)
*B23B 27/22*    (2006.01)

(52) U.S. Cl.
CPC ............... *B23B 47/34* (2013.01); *B23B 27/10* (2013.01); *B23B 27/22* (2013.01); *B23B 29/03446* (2013.01); *B23B 29/034* (2013.01); *B23B 2250/16* (2013.01); *Y10T 408/458* (2015.01)

(58) Field of Classification Search
CPC ..... B23B 29/00; B23B 29/03; B23B 29/034; B23B 27/10; B23B 2250/12; B23Q 11/1023
USPC ........... 408/143, 153, 158, 161, 181, 56, 57, 408/59, 61
IPC ............................... B23B 29/00, 29/03, 29/034
See application file for complete search history.

(56) References Cited

U.S. PATENT DOCUMENTS 2,346,546 A * 4/1944 Anderson ........... B23B 51/0486
408/223
2,640,378 A * 6/1953 Haggar ............. B23B 29/03407
279/6

(Continued)

FOREIGN PATENT DOCUMENTS

EP    0593223 A1    4/1994
FR    2960805 A1    12/2011

(Continued)

*Primary Examiner* — Daniel Howell
(74) *Attorney, Agent, or Firm* — Corinne R. Gorski

(57) ABSTRACT

A device for internal chips cutting machining in a bore having a unit for breaking up chips by internal chip cutting machining in the bore. The device includes a principal element with a longitudinal axis and with at least one movable cutter head with a cutter that can be moved essentially perpendicular to the longitudinal axis of the principal element. The device also includes a mechanism for linear motion. A nozzle for flushing of the cutter fluid on the cutter is located onto and can be moved together with the cutter head. A fluid duct is in connection with the nozzle and has a source for cutter fluid at high pressure.

12 Claims, 6 Drawing Sheets

(56) References Cited

U.S. PATENT DOCUMENTS

| | | | |
|---|---|---|---|
| 3,176,330 A * | 4/1965 | Jennings | B23B 27/10 29/DIG. 66 |
| 3,795,454 A | 3/1974 | Elchyshyn | |
| 4,847,975 A * | 7/1989 | Santi | B23B 29/03446 29/428 |
| 5,197,361 A * | 3/1993 | Carrier | B23B 29/02 408/181 |
| 5,326,198 A * | 7/1994 | Romi | B23B 29/03446 408/153 |
| 5,419,413 A * | 5/1995 | Nakata | B23B 47/34 184/27.1 |
| 5,836,727 A | 11/1998 | Scheer | |
| 2005/0258580 A1 * | 11/2005 | Digernes | F16F 7/108 267/137 |
| 2009/0187270 A1 * | 7/2009 | Hoefler | B23C 5/003 700/177 |
| 2009/0214305 A1 * | 8/2009 | Waggle | B23C 5/06 407/48 |

FOREIGN PATENT DOCUMENTS

| WO | WO 9005037 A1 * | 5/1990 | ....... B23B 29/03417 |
|---|---|---|---|
| WO | 03/093696 A2 | 11/2003 | |

* cited by examiner

DEVICE FOR INTERNAL CHIPS CUTTING MACHINING WITH A NOZZLE FOR FLUSHING CUTTER FLUID ON THE CUTTER

RELATED APPLICATION DATA

This application is a §371 National Stage Application of PCT International Application No. PCT/EP2012/054112 filed Mar. 9, 2012 claiming priority of Norwegian Application No. 20110377, filed Mar. 11, 2011.

The present invention is related to a device for internal chips cutting machining in a bore with a unit for breaking up chips.

In machining of components, for example in the aviation industry, there are various materials which are difficult to do machining on because of the problems with broken chips being produced. Broken chips are important with respect to evacuation of chips from the material. Evacuation of chips is important in order to obtain a stable process, and in order to provide for an improved opportunity of using an unmanned process. Continuous chips are difficult to evacuate, and can easily be accumulated and create problems in a machining process.

From U.S. Pat. No. 6,705,805 B2 is disclosed a chips removing machining of work pieces, where a high pressure flushing of liquid coolant is used. In this publication, a tool for chips cutting and a nozzle for flushing of liquid coolant on a cutter at high pressures are described.

From DE 196 05 069 is disclosed a numerically controlled drill rod for non-cylindrical holes. The drill rod may be inserted into a pilot hole, and contains a cutter located at the side of a threaded drive unit radially inside of the rod. By longitudinal adjustment of a central connection rod with toothing at the end, a sliding unit with a cutter and appropriate toothing, being engaged to the toothing of the connection rod, is pushed onto the connection rod, laterally in or out from the drill rod.

By internal machining with adjustable cutter heads, where the cutter is laterally pushed in and out from the cutter head, it would also be of advantage to be able to make use of high pressure flushing for breaking up the chips. However, this type of breaking up chips requires precise adjustment of the jet relative to the cutter, and according to the present invention it is therefore required to fasten one or several spray nozzles in fixed attachment to the cutter. However, this is problematic in connection with units as described above, where the cutter head can be moved laterally relative to a principal element.

For the machining process it is necessary to ensure stable machining conditions for the cutter. This means that the structure supporting the adjustable cutter has to be stable, such that no vibrations occur disturbing the machining process. During the internal machining there is a limited cross-sectional size available for a drill rod, and long overhang lengths for the tools may be required. This will have impact on the stability of the structure, and use of a damped tool is often a solution to dampen the vibrations.

The present invention is related to a device for breaking up and removal of chips from a tool for internal chips cutting machining in a bore. The device comprises a principal element with a longitudinal axis and with at least one movable cutter head with a cutter that can be moved at an angle on the longitudinal axis of the principal element. The angle can be essentially perpendicular. Typically the principal element constitutes the most essential part of a drill rod. Drill rods are usually cylindrical, and are often fastened into a machine tool at one end, and is connected to the cutter at the other end. The cutter head can be moved between an inside position and an outside position via a mechanism for linear movement. A nozzle for flushing the cutter fluid on the cutter is mounted on the cutter head, and can be moved together with the cutter head. A fluid duct is in connection with the nozzle and is also in connection with a source for pressurized cutter fluid. A tube for transfer of the cutter fluid is running between the principal element and the cutter head. The tube constitutes a part of the duct, such that a sliding movement between the bore and the tube is allowed, whereby the cutter fluid can be transferred between the principal element and the cutter head.

On or in connection to the principal element, there may be an outlet for flushing of cutter fluid on the cutter with large flow volumes, in order to flush the chips away from the process.

The tube for transfer of cutter fluid may be adapted, for transfer of cutter fluid at high pressures, and may be fastened into the principal element. It may constitute a part of the duct. The tube may run into a bore on the cutter head, such that a sliding movement is allowed between the bore and the tube, whereby cutter fluid can be transferred between the principal element and the cutter head.

Alternatively, the tube may be fastened into the cutter head, and may run glidingly in a bore of the principal element. Alternatively, the tube can run glidingly relative to both the cutter head and the principal element.

The mechanism for linear movement may comprise an actuating rod running parallel with the centre axis of the principal element. The actuating rod may comprise inclined elements for gliding engagement with inclined structures on the cutter head, such that the linear movement of the actuator rod results in a linear movement of the cutter head in a direction essentially perpendicular to the principal element. The inclined elements may be one or several wedges in wedge slots, grooves or ridges. However, completely different mechanisms may be used for linear movements, for example drive screws, step motors, hydraulic systems etc. The actuating rod may be led through a damping system.

The device may further comprise an outlet flushing of cutter fluid with large flow volumes on the principal element. A set with holes, or a slot, may be located close to the cutter head for flushing of larger amounts of cutter fluid for transport of chips away from the cutter. The holes may have nozzles mounted, thus controlling the flushing of cutter fluid. The term "nozzle" may be used both for a separate nozzle insert, or a specifically machined duct shape at the outlet, but in the simplest embodiment it may be constituted by a single bore. Ducts for the cutter fluid may be located in the rod body, which constitutes the essential part of the drill rod. The cutter fluid may flow within or around the actuating rod.

The mechanism for linear movement of the cutter head can pass through or past a damping system for removal of vibrations.

Ducts for cutter fluids can pass through or past the damping system, around the actuating rod or in a duct in the actuating rod.

The cutter can be fastened to a separate, removable part being fixedly mounted onto the cutter head.

The nozzle can be located on a nozzle block. The nozzle block can also be fastened as a separate, removable part on the cutter head.

The device may further comprise a damping unit with a damping mass fastened with elastic bodies, and the actuator rod may run through the damping mass and the elastic bodies.

The direction of motion of the cutter head and the longitudinal axis of the principal element can be perpendicular to each other.

The actuating rod can contain a cutter fluid duct, and a second tube for transfer of the cutter fluid that runs between the actuating rod and a front cover. The tube constitutes a part of the duct, such that a sliding movement is allowed between the bore and the tube, whereby cutter fluid can be transferred between the actuating rod and the cutter head.

According to the invention, in order to have the chips broken up, cutter fluid with a pressure of for example 400 bar may be applied. Additionally, it has to be relied on that the jet is a directed jet with an exactly precise point of impact on the cutter. Further, the distance between the spray nozzles should be as small as possible. Machines with lower pressures do also benefit greatly from a directed jet. At present, machines mainly use cutter fluids with a pressure of 5-20 bar, but new machines may typically deliver pressures of up to 70 bar. Breaking of the cutter has been tested at 1000 bar.

SHORT DESCRIPTION OF APPENDED FIGURES

From FIG. 1 an embodiment of the invention is presented, showing the front part of a drill rod;

FIG. 2 shows the invention as shown in FIG. 1, in greater detail, where the front part has been cut through;

DETAILED DESCRIPTION OF ONE EMBODIMENT OF THE INVENTION, WITH REFERENCE TO THE APPENDED FIGURES

Figure 1:
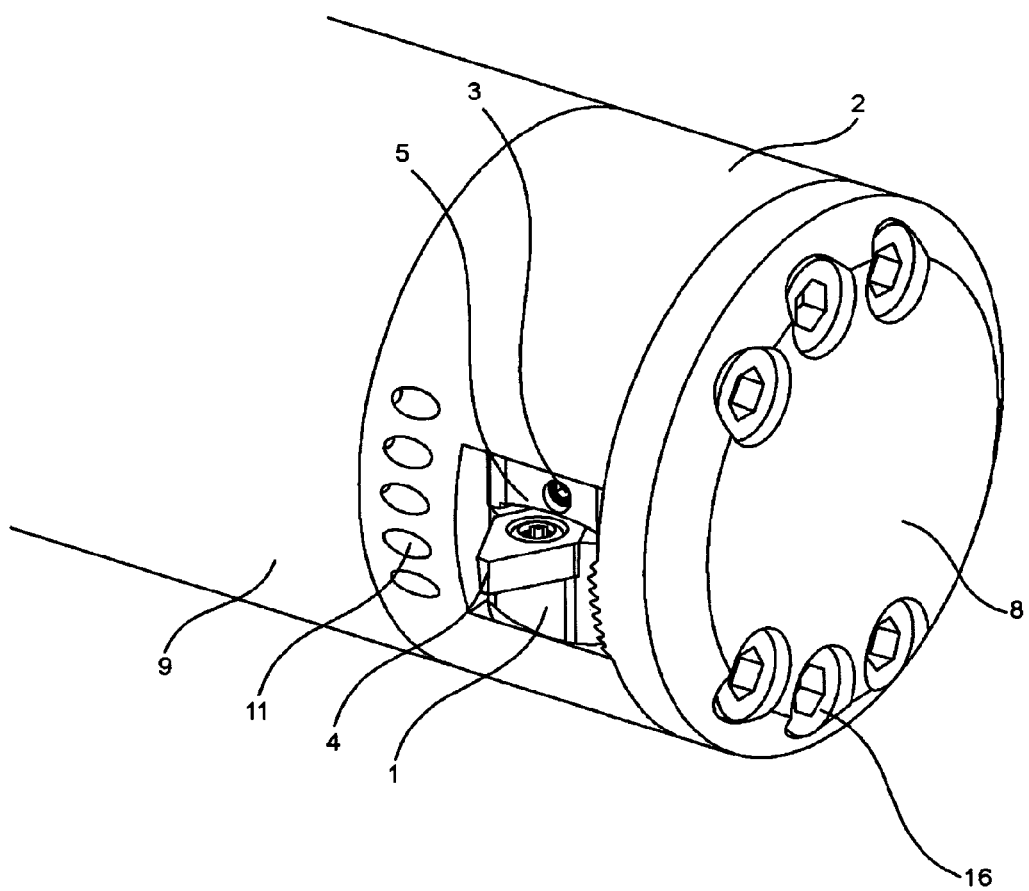

From FIG. 1 an overview of the invention is presented, shown at the end of a drill rod comprising a principal element 2. The principal element 2 is fastened to a rod body 9, and a front cover 8 is fastened with screws 16 on the principal element. A cutter head 1 can be brought in and out from the principal element 2. A nozzle block 5 is mounted onto the cutter head 1. In this, there is a high-pressure nozzle 3 being mounted, which is adapted to spray cutter fluid on the cutter 4 at high pressures. By having the nozzle block 5 fastened onto the cutter head 1, a constant distance and same angle of impact are ensured for the jet, independently of the cutter position between the nozzle 3 and the cutter 4. Typically, the cutter 4 is a common removable cutter made of hard metal or from a sintered material. Ducts or outlets 11 for cutter fluids flush out the cutter fluid to remove chips from the cutter zone.

The rod body 9 is typically a static drill rod or a rotating drill rod for fastening onto a tooling machine, and for introduction into a rotating work piece, and supports the principal element 2 and the front cover 8. As shown, the unit is intended for turning in the side wall, in a pilot hole that already has been machined. From FIG. 1, five outlets 11 for cutter fluid are seen, which flush the cutter fluid with a higher flow rate and lower pressure than the cutter fluid being flushed out from the high pressure nozzle 3. One high pressure nozzle 3 is shown on the tool block 5, but two or more nozzles may be used if this is desirable. The high pressure nozzle 3 mat alternatively be integrated into the cutter head 1, but this will provide less flexibility, and the adjustment opportunities will be reduced.

The cover 8 may include the function of providing support for the cutter head 1, and may seal off or close the construction. The principal element 2 may be responsible for supporting the cutter head, and may serve as a bearing for the actuating rod 10. The principal element may also serve as a duct for conducting the cutter fluid.

Figure 2:
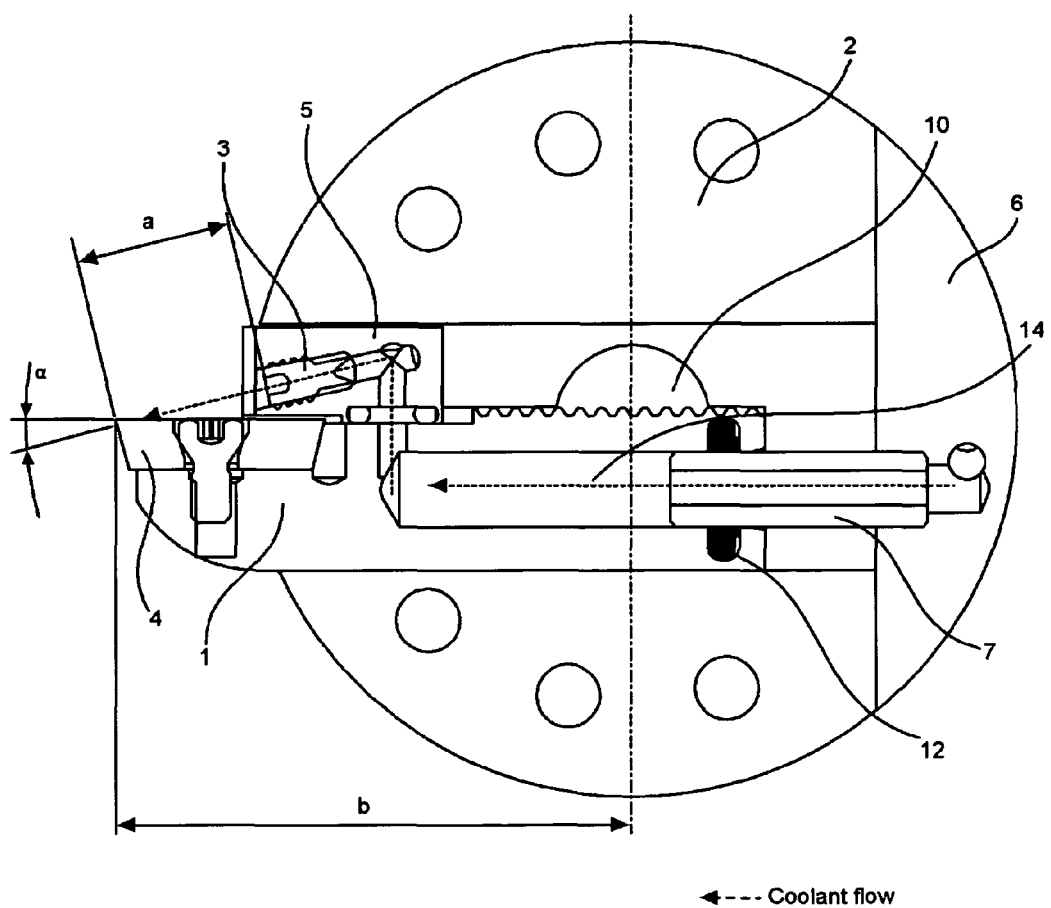

FIG. 2 shows a drill rod being cut through, and shows the cutter head 1 with cutter 4 and nozzle block 5, as well as the mechanism for moving the position (b) of the cutter 4 relative to the central axis of the principal element 2. The cutter head 1 is shown with inclined grooves 13 (FIG. 4), to be engaged with matching inclined grooves in an actuating rod 10. The actuating rod 10 can slide axially, inside in the principal element 2 and the rod body 9 (FIG. 1), and upon axial movement it will push the cutter head 1 in a direction that is perpendicular to the axis of the actuating rod and the direction of motion. The distance (a) and the angle (a) of the jet from cutter fluid on the cutter will, when changing the distance (b) to the cutter head 1, remain constant. The actuating rod 10 is connected to a controlled actuator on a tooling machine, or a unit for manual feeding.

A tube 7 is fastened into a fluid duct block 6, and is in this manner connected to a high pressure pump for the cutter fluid, which in turn is in connection with a duct in the principal element 2 and the rod body 9 (FIG. 1). The tube runs into a bore of the cutter head 1, and may slide relative to the cutter head 1. Suitable gaskets or sealants 12 may be located internally in the cutter head 1, in order to seal off between this and the tube 7. Alternatively, the gaskets or sealants 12 could be mounted onto the tube 7 (not shown). In this manner, a movable transfer of cutter fluid at high pressures between the principal element 2 and the cutter head is allowed, by allowing the cutter head to slide to and fro on the tube 7. The duct through the tool, for the cutter fluid, is shown with dotted lines. Alternatively, the tube may be fastened in the cutter head 1, and can be moved in and out from a bore in the fluid duct block 6. However, this will demand for a different dimensioning than the one shown in the figures. A duct 14 for coolant fluid is schematically shown. The duct is running from the high pressure pump, through a duct in the principal element 2, through the fluid duct block 6, through the tube that is fastened into the fluid duct block 6 through a bore in the cutter head 1, through the nozzle block 5 and through the nozzle 3. The high pressure pump can be a pump capable of delivering a pressure in the order of 400 bar.

Figure 3:
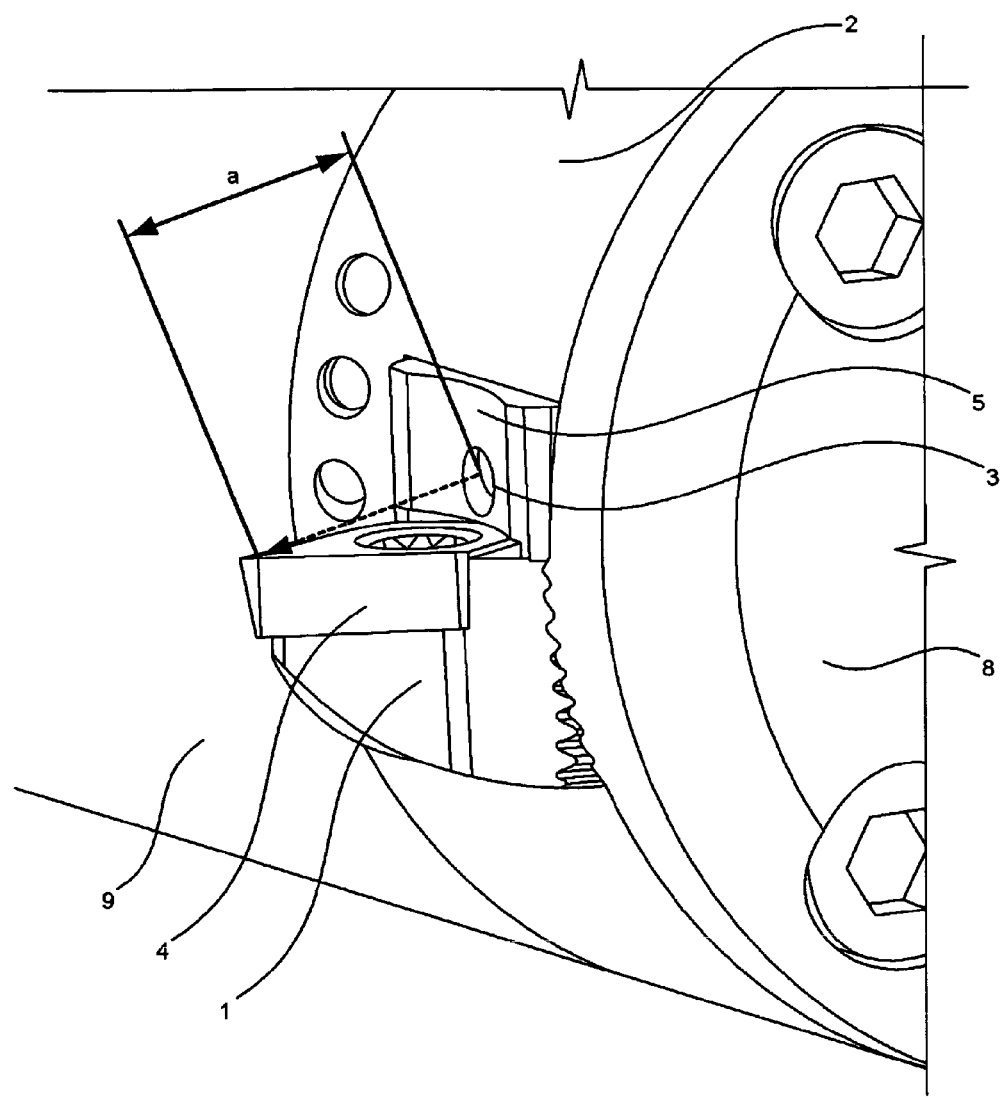
FIG. 3 shows the invention as shown in FIG. 1, in greater detail, where the cutter head is shown in the outside position with nozzle, according to the invention.

FIG. 3 shows the cutter head 1 with the cutter 4, nozzle block 5 and the nozzle 3 in an outer radial position. The nozzle block 5 with the nozzle 3 is located above the cutter. From this figure, the location of the nozzle above and behind the cutter is clearly seen. Since the nozzle 3 is seated on the nozzle block 5, which again is seated on the cutter head 1, the point of impact for the cutter fluid on the cutter is kept constant. The nozzle block 5 is fastened as a separate part on the cutter head 1 (which is more clearly shown in FIG. 5). This makes it possible to change nozzle blocks 5 to change the angle α (shown in FIG. 2) and the distance (a), such that the nozzle provides different points of impact onto the cutter, or which makes the unit adaptable to different cuttings. Also, nozzles providing different spreads for the cutter fluid, or which provide different pressures and flow rates, to adapt the unit to different situations without having to replace the whole cutter head 1 or the nozzle block 5, may be inserted. The front cover 8 keeps the cutter head in place between this and the principal element 2, which in turn is fastened into the rod body 9.

Figure 4:
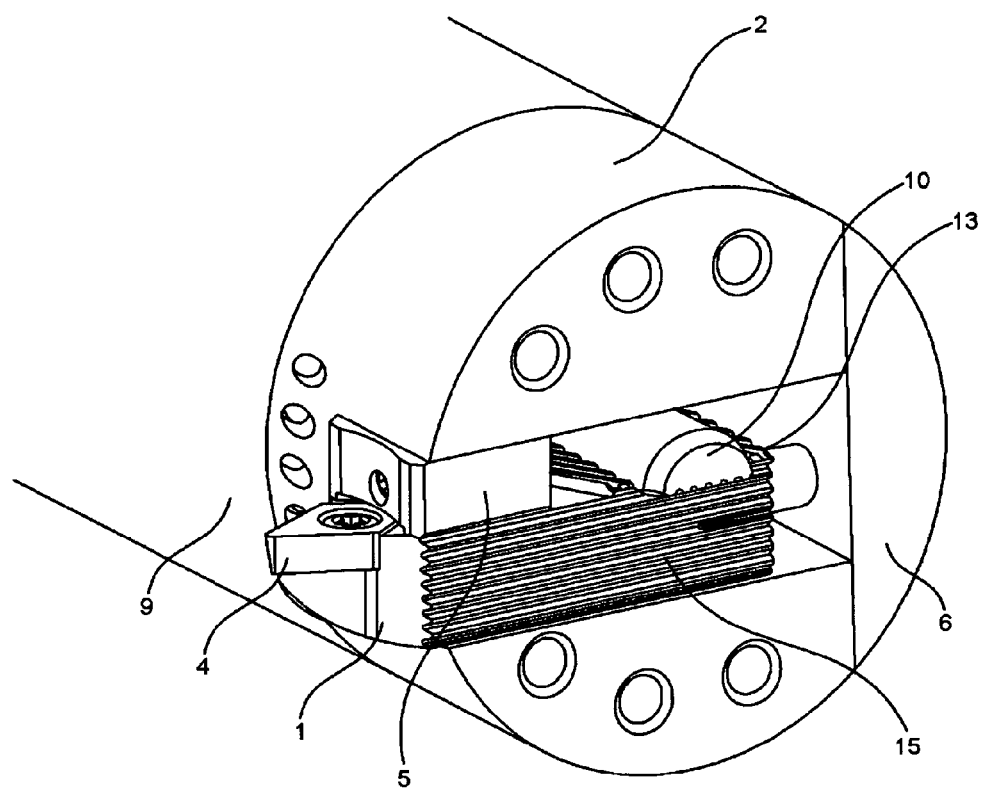
FIG. 4 shows the invention as shown in FIG. 1, in greater detail, where the cutter head is shown in the outside position with the front cover removed, where the cutter slide and the actuating rod are shown, according to the invention.

FIG. 4 shows the principal element 2, where the front cover 8 is removed. Again, the cutter head 1 is shown with a cutter 4. The cutter head 1 and the front part of the principal element 2 comprise mutually matching bearing grooves 15. The grooves 15 of cutter head 1 press against the matching grooves of the principal element 2, and make sure that the cutter head can be brought back and forth without slack, and may thus safeguard sufficient tolerances during operation. The inclined grooves 13 are shown in engagement with grooves in the actuating rod 10. Upon longitudinal movement of the actuating rod 10, the cutter head 1 will also move with a longitudinal motion being essentially perpendicular to the actuating rod, as explained above. The inclined grooves 13 may be replaced by other mechanisms, for example a wedge in a wedge slot.

Figure 5:
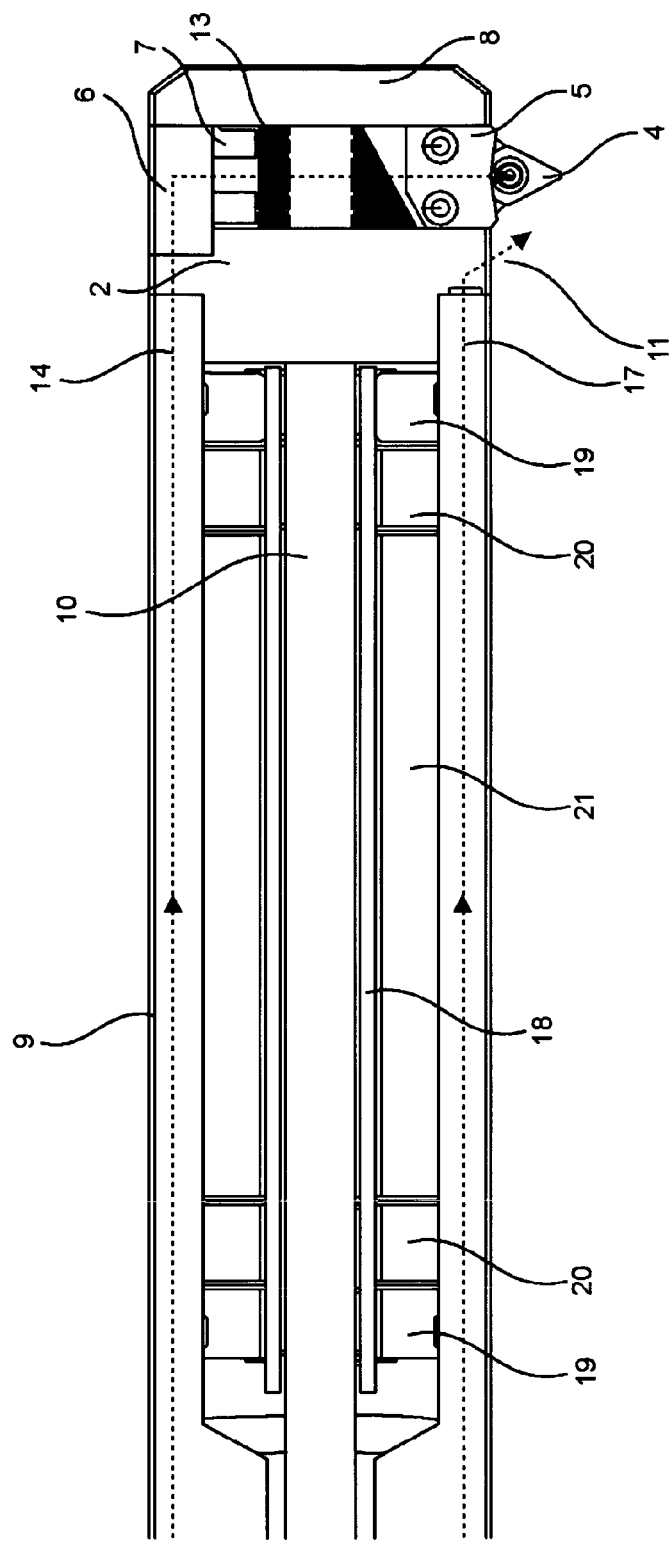
FIG. 5 shows a drill rod that has been cut through, with a damping system from another angle, where the cutter slide, the actuating rod and its passing through a damping system, as well as transfer of liquid coolants, according to the invention.

FIG. 5 shows the front of a drill rod being cut through, with a damping system for removing vibrations. The damping system comprises a central tube 18, disks 19, springs or elastic bodies 20 and a damping mass 21. The actuating rod 10 is passed through the central tube 18 of the damping system, and can be led axially to and fro without affecting the function of the damping system.

From FIG. 5 it is further shown that the cutter fluid duct, for breaking up chips 14 at high pressure, is running in a longitudinal direction inside the rod body 9, and that a flushing 17 cutter fluid duct is running in the same manner through the rod body 9 at the opposite side of the cutter fluid duct for breaking up chips 14. The flushing 17 cutter fluid duct ends up at the flushing outlet 11, which flushes cutter fluid on the cutter 4 to carry chips away. The cutter fluid duct, for breaking up chips 14, is going through the principal element 2 and into a fluid duct block 6. The tube 7 is fastened into the fluid duct block 6, and forms an extension of the cutter fluid duct 14 for breaking up chips. The tube 7 is running in a bore in the cutter head 1. A sealant (reference numeral 12 in FIG. 2), in the form of an O-ring or similarly, provides for a fluid tight and gliding connection between the tube 7 and the cutter head 1. This also results in that a cutter fluid with a high pressure may be conducted to the cutter head at the same time as the cutter head is allowed a movement relative to the principal element 2 etc. The duct is then running into a nozzle block 5, which is fastened to the cutter head. The nozzle block 5 comprises a nozzle (reference numeral 3 in FIG. 1), which is adapted to flush cutter fluid on the cutter 4 in order to break up chips which have been chopped in smaller chunks. The entire nozzle block 5, or just one nozzle in the nozzle block 5, can be replaced in order to vary the spread or the point of impact. The front cover 8 keeps the cutter head in place, at the same time as the cutter head is allowed movement back and forth in a perpendicular direction relative to a longitudinal axis of the rod body 9. The ducts 14 and 17 may be made as common bores in the rod body 9, the principal element 2, the fluid duct block 6, the cutter head and nozzle block 5. The inclined grooves 13 are running into inclined grooves of the actuating rod 10, as explained previously. The pressure in the cutter fluid duct with high pressure 14 will press the cutter head 1 against an outside position and may contribute to the damping of possible vibrational movements between the cutter head and the rest of the tools. From FIG. 5 it is clear how the cutter head is glidingly located in a room being formed between the front cover 8 and the principal element 2.

Alternatively, the tube 7 may of course be fastened to the cutter head, and the sealants or O-rings may then be seated in the fluid duct block 6. The cutter fluid may possibly be transferred by other means to tube 7 for introduction of cutter fluid to the cutter head.

Figure 6:
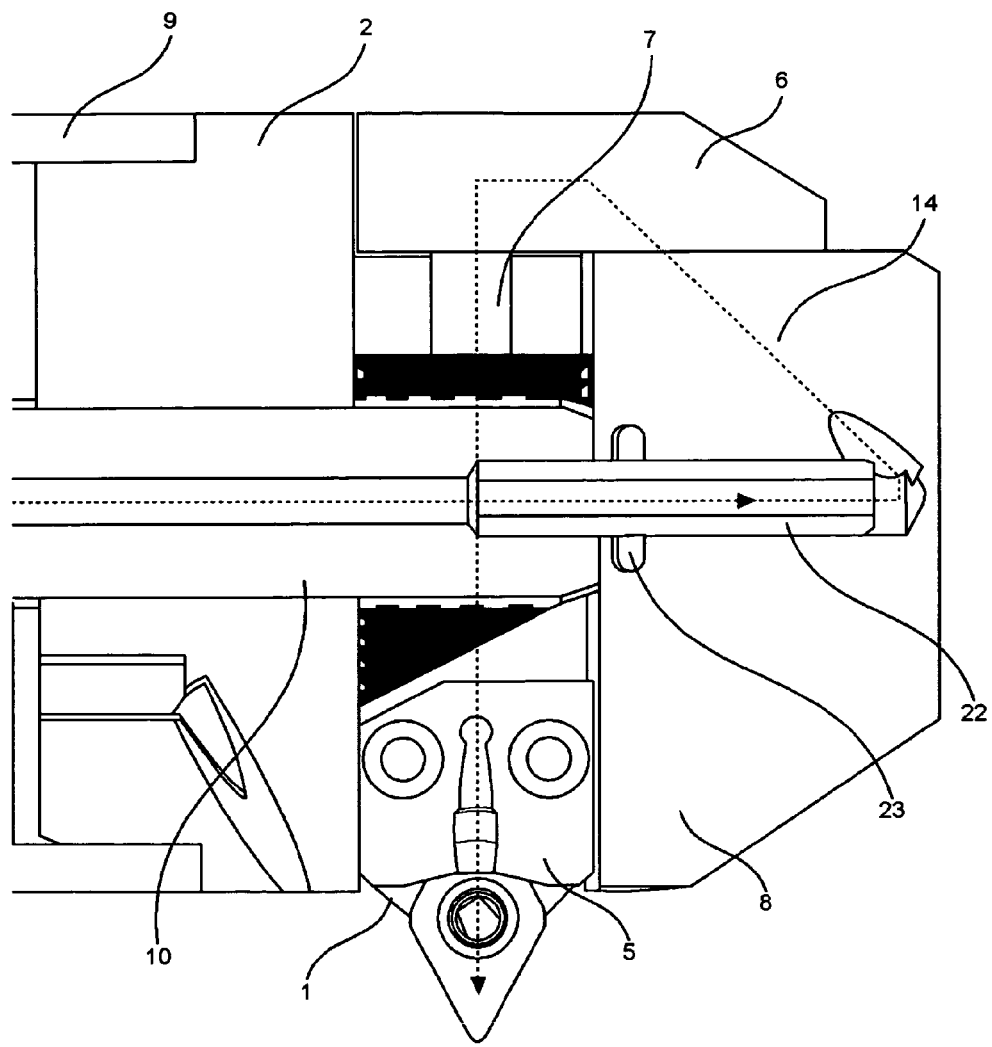
FIG. 6 shows the front part of a drill rod that has been cut through, where the cutter fluid is conducted through an actuating rod.

FIG. 6 shows the front of a drill rod, being cut through, with an alternative transfer of cutter fluid to the movable cutter head 1. The cutter fluid is conducted through a cutter fluid duct in the actuating rod 10. This normally results in more sealants, but then there is no need for conducting the cutter fluid to the sides of the principal element. From the figure it is further shown that the cutter fluid duct, for breaking up chips 14 at high pressures, is running in a longitudinal direction inside the actuating rod 10.

The cutter fluid duct is then led into a second tube 22 being mounted on the actuating rod 10. The second tube 22 is glidingly located between the actuating rod 10 and a front part or a cover 8. The tube 22 is running in a bore in the front cover 8. A sealant 23, in the form of an O-ring or similarly, provides for a fluid tight and gliding connection between the tube 22 and the front cover 8. From the front cover 8, the duct 14 for cutter fluid is conducted to the fluid duct block 6, the tube 7, and to the cutter head 1. This also results in that the cutter fluid with high pressure is allowed a movement relative to the principal element 2 etc. The cutter fluid may for example also be conducted at the outside of the actuating rod 10, even though this implies more sealants, and will be unnecessarily complicating.

The second tube 22, for transfer of the cutter fluid that runs between the actuating rod 10 and the front cover 8, constitutes a part of the duct 14, hence allowing a sliding movement between the bore and the tube 22, by that the tube is glidingly located in the front cover 8, in the actuating rod 10, or in both. The bore in the actuating rod 10 and the bore in the cover 8 for the second tube are parallel with the direction of motion for the actuating rod 10. Suitable sealants are used, that ensure the transfer of cutter fluid without excess leakage. In the shown solutions, the cutter head is moving perpendicularly to the axis of the principal element. However, this angle may be somewhat deviated, without departing from the scope of the invention.

In the shown solutions, the linear movement of the cutter head is provided with inclined grooves or wedges in the cutter head and the actuating rod. However, other mechanisms may also be used for transfer of the movement between the actuating rod and the cutter head. For example, the actuating rod can be rotated relative to the tool head instead of being moved linearly, and a transfer mechanism may then comprise engaging teeth, a pin on the rod in a groove on the cutter head, or other known mechanisms. However, the shown embodiment is considered to provide good precision and favourable mechanical conditions.

The invention claimed is:

1. A device for internal chips cutting machining in a bore, comprising:
   a principal element having a longitudinal axis and at least one moving cutter head including a cutter, wherein the cutter can be moved in a direction at an angle to the longitudinal axis of the principal element between an inside position and an outside position via a mechanism for linear movement;

a nozzle arranged to break up chips by flushing of cutter fluid on the cutter, wherein the nozzle is located on and can be moved together with the cutter head;

a fluid duct in connection with the nozzle and with a source for pressurized cutter fluid, the fluid duct being a bore in the principal element and a bore in the cutter head; and a tube for transfer of the cutter fluid, the tube having opposed ends and running between the principal element and the cutter head, wherein the tube is fixed at one end to one of the bore in the principal element or the bore in the cutter head and at the other end is glidingly movable in the other of the bore in the principal element or the bore in the cutter head, such that a sliding movement is allowed between a respective bore and the tube, whereby the cutter fluid can be transferred between the principal element and the cutter head.

2. A device according to claim 1, wherein the tube is fixedly connected to the principal element and glidingly runs in the bore of the cutter head.

3. A device according to claim 1, wherein the tube is fastened onto the cutter head and constitutes a part of the duct, as the tube is glidingly running in the bore of the principal element.

4. A device according to claim 1, wherein the mechanism for linear motion comprises an actuating rod running parallel with the central axis of the principal element, wherein the actuating rod comprises inclined elements for gliding engagement with inclined structures on the cutter head, such that linear motion of the actuating rod results in a linear motion of the cutter head in a direction being essentially perpendicular to the principal element.

5. A device according to claim 1, wherein the mechanism for linear motion of the cutter head passes through or past a damping system for removing vibrations.

6. A device according to claim 4, wherein ducts for cutter fluids pass through or past a damping system, around the actuating rod or in a duct in the actuating rod.

7. A device according to claim 1, wherein the nozzle is located in a nozzle block fastened as a separate, removable part on the cutter head.

8. A device according to claim 1, wherein the cutter is located on a separate removable part on the cutter head.

9. A device according to claim 4, further comprising a damping unit with a damping mass fastened with elastic bodies, and wherein the actuating rod runs through the damping mass and the elastic bodies.

10. A device according to claim 4, further comprising ducts for cutter fluid disposed in a rod body or outside/around the actuating rod, and at least one flushing outlet, with or without a nozzle, disposed in the principal element for flushing out the chopped chips broken up by the cutter fluid away from the nozzle on the cutter head.

11. A device according to claim 1, wherein the direction of motion for the cutter head and the longitudinal axis of the principal element are perpendicular to each other.

12. A device according to claim 4, wherein the actuating rod includes a duct for cutter fluid, and a second tube for the transfer of the cutter fluid running between the actuating rod and a front cover, wherein the tube constitutes a part of the duct, such that a sliding motion between the bore and the tube is allowed, whereby cutter fluid can be transferred between the actuating rod and the cutter head.

* * * * *

UNITED STATES PATENT AND TRADEMARK OFFICE
CERTIFICATE OF CORRECTION

Page 1 of 1

PATENT NO. : 9,475,127 B2
APPLICATION NO. : 14/004378
DATED : October 25, 2016
INVENTOR(S) : Tormod Jensen It is certified that error appears in the above-identified patent and that said Letters Patent is hereby corrected as shown below:

On the Title Page

Item (71) Applicant should read: Teeness ASA

Signed and Sealed this
Eighteenth Day of April, 2017

Michelle K. Lee
*Director of the United States Patent and Trademark Office*